United States Patent
Tian et al.

(10) Patent No.: US 8,244,500 B2
(45) Date of Patent: Aug. 14, 2012

(54) METHOD OF ADJUSTING WAFER PROCESSING SEQUENCE

(75) Inventors: Yun-Zong Tian, Taichung County (TW); Chun Chi Chen, Taipei (TW); Yi Feng Lee, Taichung County (TW); Wei Jun Chen, Taichung County (TW); Shih Chang Kao, Kaoshiung (TW); Yij Chieh Chu, Taipei County (TW); Cheng-Hao Chen, Taipei (TW)

(73) Assignee: Inotera Memories, Inc., Taoyuan County (TW)

( * ) Notice: Subject to any disclaimer, the term of this patent is extended or adjusted under 35 U.S.C. 154(b) by 627 days.

(21) Appl. No.: 12/476,559

(22) Filed: Jun. 2, 2009

(65) Prior Publication Data

US 2010/0256792 A1    Oct. 7, 2010

(30) Foreign Application Priority Data

Apr. 6, 2009    (TW) .............................. 98111357 A

(51) Int. Cl.
G06F 11/30    (2006.01)
G06F 19/00    (2011.01)
(52) U.S. Cl. ........................ 702/182; 700/108
(58) Field of Classification Search .............. 702/35, 702/36, 80–84, 105, 179–184; 700/95, 96, 700/108–110; 710/15–19, 104
See application file for complete search history.

(56) References Cited

U.S. PATENT DOCUMENTS

| 5,546,312 | A | * | 8/1996 | Mozumder et al. ............. 700/97 |
| 5,991,699 | A | * | 11/1999 | Kulkarni et al. ............... 702/83 |
| 6,003,029 | A | * | 12/1999 | Agrawal et al. ..................... 1/1 |
| 6,961,626 | B1 | * | 11/2005 | Paik ............................... 700/31 |
| 7,221,990 | B2 | * | 5/2007 | Paik ............................. 700/109 |
| 7,340,320 | B2 | * | 3/2008 | Takizawa et al. ............. 700/121 |
| 2007/0282475 | A1 | * | 12/2007 | Schmidt ......................... 700/99 |
| 2008/0027577 | A1 | * | 1/2008 | Horak et al. .................. 700/121 |
| 2008/0306621 | A1 | * | 12/2008 | Choi et al. .................... 700/110 |

OTHER PUBLICATIONS

Error-Aware Density-Based Clustering of Imprecise Measurement Values, Habich et al., IEEE 2007.*
A Density-Based Algorithm for Discovering Clusters in Large Spatial Databases With Noise, Ester et al., 1996.*

* cited by examiner

*Primary Examiner* — Khanh Dang
(74) *Attorney, Agent, or Firm* — Rosenberg, Klein & Lee

(57) ABSTRACT

A method of adjusting wafer process sequence includes steps of collecting production parameters for a plurality of lots; selecting a plurality of key parameters from the production parameters, wherein the key parameters at least includes a processing sequence; defining a formula to obtain an epsilon value; categorizing the lots into groups according to the epsilon value and the minimum point number by using density-based spatial clustering of application with noise (DBSCAN); and adjusting the processing sequences of the lots in the groups. Thereby, the lots with the same process recipe can be continuously or simultaneously sent into a machine, thereby reducing replacement of process recipes or shortening machine idle time.

12 Claims, 5 Drawing Sheets

| No. | time gap | time delay | processing sequence |
|---|---|---|---|
| 01 | 0.139753976 | 0.920554527 | 1 |
| 02 | 0.044041875 | 0.752652184 | 2 |
| 03 | 0.049388991 | 0.89086366 | 1 |
| 04 | 0.135712918 | 0.759589414 | 1 |
| 05 | 0.149363187 | 0.730277033 | 2 |
| 06 | 0.201340119 | 0.949370092 | 3 |
| 07 | 0.018986119 | 0.164575954 | 1 |
| 08 | 0.150633152 | 0.510138626 | 4 |
| 09 | 0.092021822 | 0.117657833 | 8 |
| 10 | 0.129059755 | 0.160833272 | 9 |
| 11 | 0.123579281 | 0.886947785 | 8 |
| 12 | 0.058479937 | 0.76130901 | 7 |
| 13 | 0.15247265 | 0.768975117 | 7 |
| 14 | 0.001101365 | 0.20245623 | 8 |
| 15 | 0.026147819 | 0.859770936 | 4 |
| 16 | 0.189423431 | 0.648674023 | 2 |
| 17 | 0.160253166 | 0.547669587 | 1 |

FIG. 4

| key parameter | time gap | time delay | processing sequence |
|---|---|---|---|
| weighted value | 0.3 | 0.35 | 0.35 |
| upper limit (Range) | 0.22day | 1day | 10 |

FIG. 5

| No. | time gap | time delay | processing sequence | difference ("distict") | epsilon value |
|---|---|---|---|---|---|
| 01 | 0.139753976 | 0.920554527 | 1 | | |
| 02 | 0.044041875 | 0.752652184 | 2 | 0.476931921 | 0 |
| 03 | 0.049388991 | 0.89086366 | 1 | 0.411821632 | 0 |
| 04 | 0.135712918 | 0.759589414 | 1 | 0.162009776 | 1 |
| 05 | 0.149363187 | 0.730277033 | 2 | 0.21904747 | 1 |
| 06 | 0.201340119 | 0.949370092 | 3 | 0.345246385 | 1 |
| 07 | 0.018986119 | 0.164575954 | 1 | 0.934261207 | 0 |
| 08 | 0.150633152 | 0.510138626 | 4 | 0.510770588 | 0 |
| 09 | 0.092021822 | 0.117657833 | 8 | 1.087067903 | 0 |
| 10 | 0.129059755 | 0.160833272 | 9 | 1.104327545 | 0 |
| 11 | 0.123579281 | 0.886947785 | 8 | 0.704652256 | 0 |
| 12 | 0.058479937 | 0.76130901 | 7 | 0.722382015 | 0 |
| 13 | 0.15247265 | 0.768975117 | 7 | 0.621545302 | 0 |
| 14 | 0.001101365 | 0.20245623 | 8 | 1.184428671 | 0 |
| 15 | 0.026147819 | 0.859770936 | 4 | 0.600295721 | 0 |
| 16 | 0.189423431 | 0.648674023 | 2 | 0.367275393 | 1 |
| 17 | 0.160253166 | 0.547669587 | 1 | 0.384350548 | 1 |

FIG. 6

METHOD OF ADJUSTING WAFER PROCESSING SEQUENCE

BACKGROUND OF THE INVENTION

1. Field of the Invention

The present invention relates to a method of adjusting the wafer processing sequence, and specially to a method of adjusting the wafer processing sequence for semiconductor manufacture.

2. Description of Related Art

In semiconductor manufacturing, each lot of wafers (hereinafter referred as to "lot") needs to be subjected to multiple processes through a plurality of machines. In favor of semiconductor producers' profit, reducing production time and increasing productivity are the endeavors the semiconductor producers have been pursuing.

One of the key factors affecting the production time is the time for changing the process recipe. The machine needs to change its process recipe because of different designs of wafers. For example, the machine needs to adjust the processing parameters or replace modules for changing the process recipe. Therein, while the machine is changing the process recipe, the processing of wafers stops. Therefore, the longer the time needed for changing the process recipe, the longer it needs to finish the manufacturing of wafers. Some machines take less time to finish the change of process recipe. However, others, such as a photolithography machine, take much longer to do so.

When the photolithography machine processes a first lot, it uses a first mask. Before proceeding the processing of a second lot with different process recipe, the first mask needs to be moved out and then a second mask need to be moved in. The replacement of the masks takes time; therefore the total production time for the second lot becomes longer.

The other key factor is the time the machine waits for the next lot, even though the process recipes for the previous lot and the next lot are the same. Since the machine is a batch-type machine, the machine starts to operate only when a predetermined amount of lots with the same process recipe are inside the machine. For example, if the determined amount of lots is 4, the furnace tool starts to operate as soon as all four lots are inside the furnace tool. If the amount of lots has not reached the determined amount, then the machine does not work until the rest amount of lots has been supplied, which would lead to longer time for completing the manufacturing of wafers.

In the view of above, if a process engineer fails to put those lots with the same recipe together when arranging the processing procedure, the time needed to finish the manufacture of wafers unavoidably increases.

Therefore, there is a need for an improved method that overcomes the above disadvantages.

SUMMARY OF THE INVENTION

It is one object of the present invention to provide a method of adjusting wafer processing sequence, which adjusts the processing sequence of lots of wafer (hereinafter referred as to "lots") with the same recipe so that those lots can be processed continuously or simultaneously.

In order to achieve the above objectives, the method of adjusting wafer process sequence of invention includes steps of: collecting production parameters for a plurality of lots; selecting a plurality of key parameters from the production parameters, wherein the key parameters at least includes a processing sequence; defining a formula to obtain an epsilon value, wherein the formula is $$\text{epsilon} = \sqrt{\sum_{i=1}^{n} \left(\frac{p_{ia}}{p_{im}}\right)^2 \times w_i},$$

$p_{ia}$ is an acceptable value, $p_{im}$ is an upper limit (Range) for the key parameters, and $w_i$ is a weighted value for the key parameters; defining a minimum point number; categorizing the lots into groups according to the epsilon value and the minimum point number by using density-based spatial clustering of application with noise (DBSCAN); and adjusting the processing sequences of the lots in the groups. The DBSCAN calculates the difference ("distinct" in the following formula) between production parameters ($p_i$ and $p'_i$) for two of the lots:

$$\text{distinct} = \sqrt{\sum_{i=1}^{n} \left(\frac{p_i - p'_i}{p_{im}}\right)^2 \times w_i}.$$

The invention offers the following advantages.

1. DBSCAN is used to categorize a plurality of lots into groups so that lots with the same process recipes are put into the same group.

2. The processing sequences for the lots in the same group are adjusted to be equal or almost equal so that they can be sent continuously or simultaneously into a machine. Thereby, the number of times required for changing the process recipe for the same machine can be significantly reduced, or the idle time for the machine can be shortened.

3. The key parameters are respectively given a weighted value so that the importance of the key parameters can be valued when the process sequence is to be adjusted. Therefore, the categorization of the lots by DBSCAN can be implemented with high precision.

In order to further understand the techniques, means, and effects the present invention takes for achieving the prescribed objectives, the following detailed descriptions and appended drawings are hereby referred; such that, through which the purposes, features, and aspects of the present invention can be thoroughly and concretely appreciated; however, the appended drawings are merely provided for reference and illustration, without any intention to be used for limiting the present invention.

BRIEF DESCRIPTION OF THE DRAWINGS

FIG. 4 shows key parameters for each lot according to the present invention.

FIG. 5 is a chart showing weight values and upper limits (Range) for the key parameters according to the present invention.

FIG. 6 shows the results of categorizing the lot NO. 01 according to the present invention.

DETAILED DESCRIPTION OF THE PREFERRED EMBODIMENTS

In one of the preferred embodiments according to the present invention, a method of adjusting the wafer processing sequence categorizes lots according to their process recipe so that the lots with similar or the same process recipe are put in the same group. The original processing sequences of the categorized wafers are changed in a manner so that the same group of wafers is continuously or simultaneously processed in the same machine.

In this embodiment, the present invention uses the clustering algorithm, density-based spatial clustering of application with noise (DBSCAN), to categorize a plurality of wafers into groups.

Figure 1:
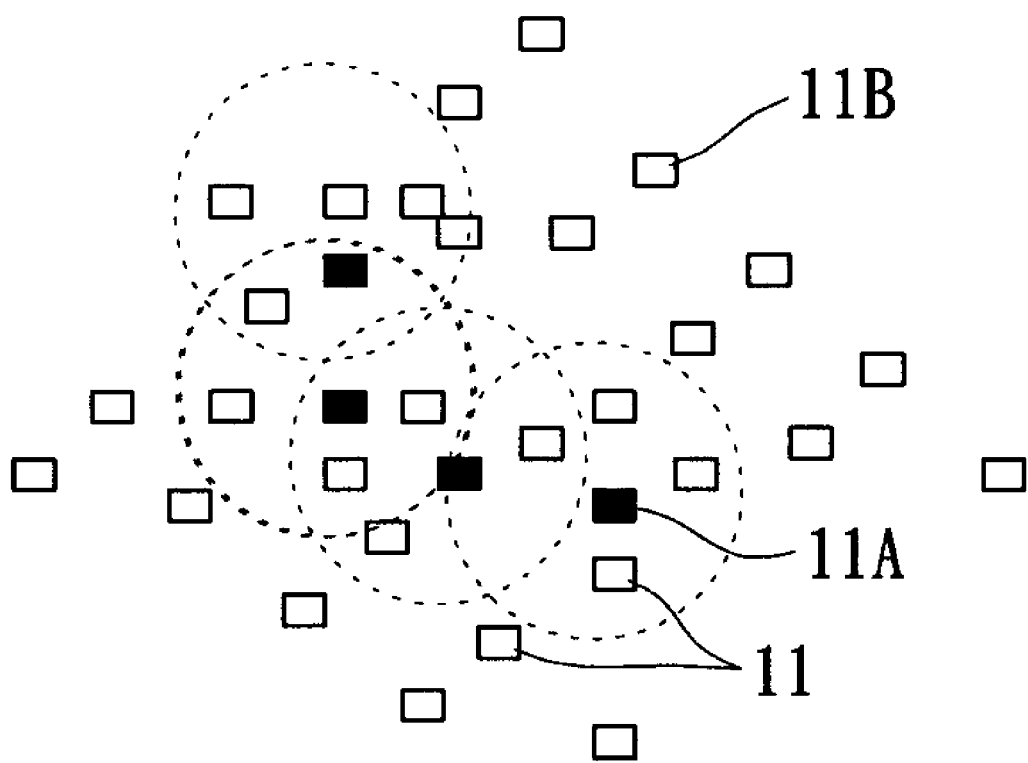
FIG. 1 is a schematic view of categorization of data points by using DBSCAN according to the present invention.

Below is a brief description of DBSCAN. Referring to FIG. 1, if a plurality of data points 11 is arranged in a space, DBSCAN selects those data points 11 which are closer to one another and put them into one group. Before DBSCAN executes, two parameters need to be set: an epsilon value and a minimum point number.

When DBSCAN executes, a first step randomly selects one of the data points as a starting point. For example, the data point 11A can be the starting point. Then the difference between the starting point 11a and other data points 11 is calculated. The number of data points which have a difference smaller than the epsilon value from the starting point 11A is calculated; in other words, determine how many data points 11 are near the starting point 11A to within the epsilon value. If the calculated number is larger than the minimum point number, then those data points 11 which have difference smaller than the epsilon value from the starting point 11A, along with the starting point 11A, are put into a group. On the other hand, if a data point 11B is selected as a starting point, then because the number of the data points 11 that have difference smaller than the epsilon value from the starting point 11B is less than the minimum point number, therefore the data point 11B is marked as a noise. Similarly, DBSCAN continues to select other data points as a next starting point and repeats the above procedure to determine if the next starting point is to group with other data points close to it and form a group, or if the next starting point is a noise.

Figure 2:
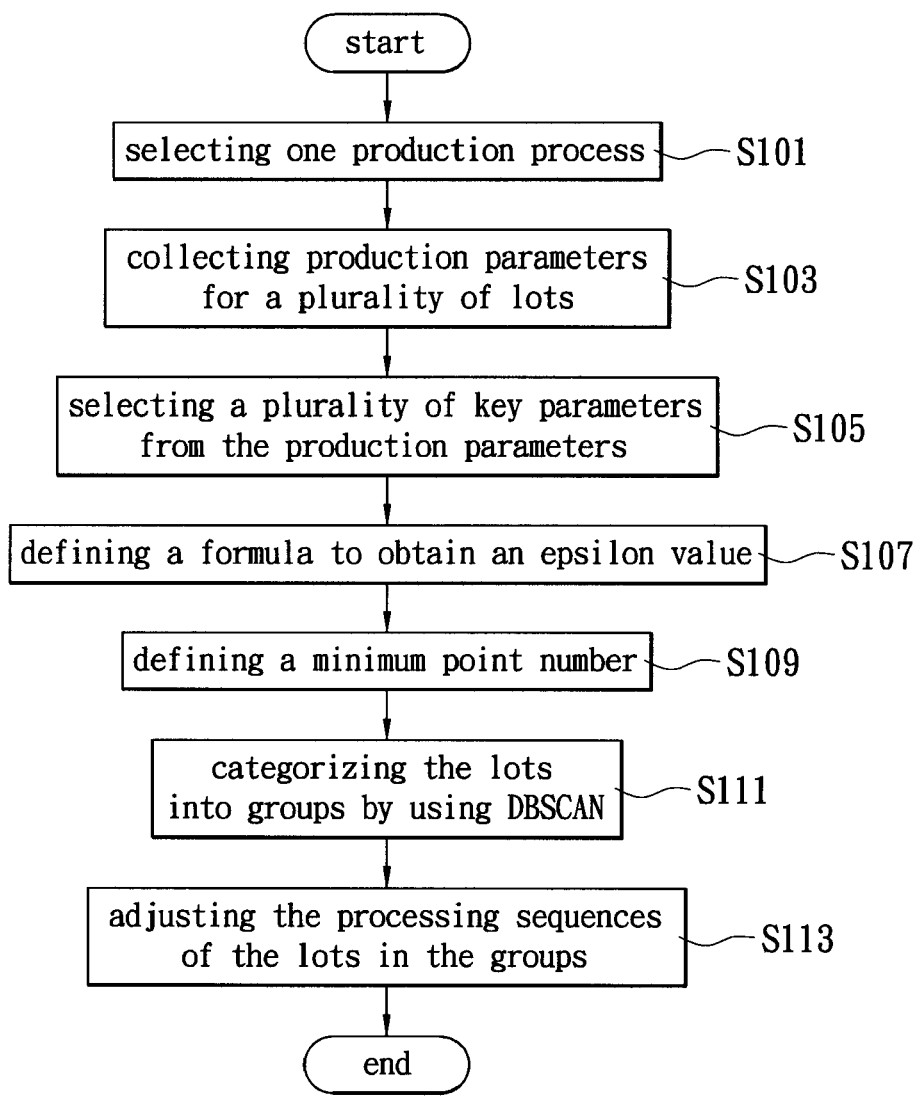
FIG. 2 is a flow chart of a method of adjusting wafer production sequences according to the present invention.

FIG. 2 shows the flow chart of implementation of the process according to the present invention.

Figure 3:
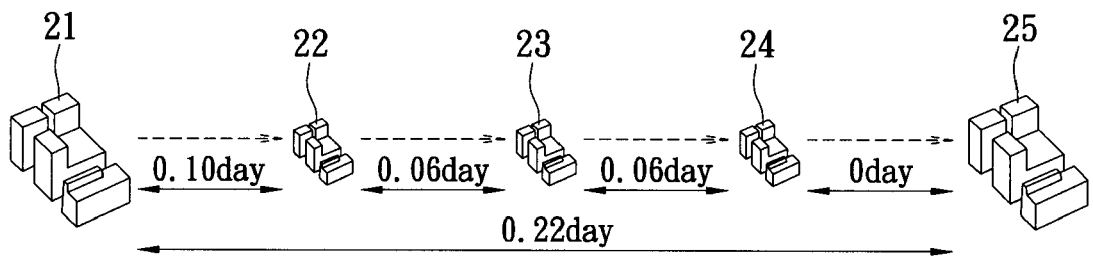
FIG. 3 is a schematic view of a production process according to the present invention.

Referring to FIG. 3, in one of the preferred embodiment of the present invention, select a processing procedure (step S101). The processing procedure uses 4 machines, including a chemical vapor deposition (CVD) machine 22, a wet etching machine 23, an etchant cleaner 24, and a photolithography machine 25. One lot is subject to the sequential processing of the CVD machine 22, the wet etching machine 23, the etchant cleaner 24, and the photolithography machine 25 after being processed in the machine 21.

The CVD machine 22, the wet etching machine 23, the etchant cleaner 24 are referred to as reference machines, while the photolithography machine 25 is referred to as a target machine. In the present invention, all lots are judged whether they have the same or similar process recipes according to their production parameters such as product specification and processing procedure. Those lots which have the same process recipe are adjusted so that they have the same processing sequence and thus are sent into the target machine. In other embodiments, this target machine can be a batch-type machine such as a furnace tool.

At the next step (step S103), collect all production parameters which are respectively obtained when the wafers are processed in the CVD machine 22, the wet etching machine 23, and the etchant cleaner 24. Since the obtained production parameters are various, some key parameters need to be picked from them (Step S105). In the present embodiment, a time gap, a time delay, and a processing sequence are the key parameters. The time gap is the period of time during which one lot is moved from the machine 21 to the photolithography machine 25. The time delay is the period of time when one lot waits for entering the machine 21. The processing sequence is a sequence of determining which lot is processed earlier than others. FIG. 4 shows the key parameters for each lot.

Below are the definitions of two parameters needed for DBSCAN: the epsilon value and the minimum point number. The epsilon value is obtained from the following formula (Step S107):

$$\text{epsilon} = \sqrt{\sum_{i=1}^{n} \left(\frac{p_{ia}}{p_{im}}\right)^2 \times w_i}$$

wherein $p_{ia}$ is an acceptable value for the key parameters, $p_{im}$ is an upper limit within the range of the key parameters, and $w_i$ is a weighted value for each key parameter. The acceptable value means if the difference (also referred to as "distinct" here below) between the production parameters for two lots is larger than the acceptable value, then the process recipes for those two lots are significantly different. The weighted value gives the weight to one production parameter when compared to others. The upper limit is the maximum value for a production parameter. FIG. 5 shows the corresponding weighted value, the upper limit, and the acceptable value for each production parameter, provided that the weighted sum of the three key production parameters equals to 1.

In the present embodiment which uses three key production parameter, i is set to 1-3. The epsilon value is obtained to be 0.392912 from $$\text{epsilon} = \sqrt{\left(\frac{0.06}{0.22}\right)^2 \times 0.3 + \left(\frac{0.2}{1}\right)^2 \times 0.35 + \left(\frac{2}{10}\right)^2 \times 0.3} = 0.392912,$$

after the acceptable value, the upper limit (range) and the weighted value are put into the formula.

Then, a minimum point number is defined (Step S109). In the present embodiment, the minimum point number is 4, i.e., at least four lots are needed for forming a group. Thereafter, DBSCAN is used to categorize those lots shown in FIG. 4 into a plurality of groups (Step S111).

When DBSCAN starts to categorize, one lot is randomly selected as a starting point. For example, in the present embodiment, the lot NO. 01 is used as the starting point. Then, the production parameters of other lots NO. 02 to NO. 17 are collected and their key parameters are selected respectively. Differences ("distinct") between the key parameters of the starting point NO. 01 (lot NO. 01) and other points NO. 02-17 (lot NO. 02-17) are subsequently obtained from the following formula:

$$\text{distinct} = \sqrt{\sum_{i=1}^{n} \left(\frac{p_i - p'_i}{p_{im}}\right)^2 \times w_i}$$

wherein $p_i$ represents a key parameter for one lot, and $p'_i$ means a key parameter for another lot. Taking the lot NO. 02 as an example, the difference ("distinct") between the lot NO. 01 and the lot NO. 02 is obtained from:

$$distinct = \sqrt{\left(\frac{0.139-0.135}{0.22}\right)^2 \times 0.3 + \left(\frac{0.920-0.759}{0.2}\right)^2 \times 0.35 + \left(\frac{1-1}{10}\right)^2 \times 0.35} = 0.1620$$

FIG. 6 shows the differences ("distinct") of the starting point NO. 01 and other points NO. 02-17. When the numeral in the column of epsilon value is 1, it means the difference between the calculated point and the starting point is smaller than the epsilon value. On the other hand, when the numeral in the column of epsilon value is 0, it means the difference between the calculated point and the starting point is larger than the epsilon value.

At the next step, the number of the lots which have differences smaller than the epsilon value from the starting point (i.e. the lot NO. 01) is calculated. In the present embodiment, there are in total 5 lots. Subsequently, determine whether this obtained number (i.e. 5) is larger than the minimum point number. If yes, then this means that those lots have difference smaller than the epsilon value, and so those lots along with the lot that acts as the starting point are categorized into one group; in other words, the 5 lots and the lot that acts as the starting point are categorized into one group. Specifically, in the present embodiment, the minimum point number is 4, and the lots NO. 01, 04, 05, 06, 16, and 17 are categorized into the same group. On the other hand, if the obtained number is smaller than the minimum point number, then DBSCAN selects another lot as a next starting point and repeats the above processing procedure.

After DBSCAN categorizes those lots, the processing sequence is then adjusted so that those lots which have the same or similar process recipes are processed simultaneously or continuously (Step S113). For example, when one group including the lots NO. 05, 06, and 16 is set to be processed later than the lots NO. 01, NO. 04, and NO. 17, the processing sequences for the lots NO. 05, NO. 06, and NO. 16 are changed to be 1. In such situation, the lots in the same group can be sent continuously into the photolithography machine 25 in a manner such that the replacement of masks used for the photolithography machine 25 is reduced.

In light of the above, the method of adjusting the wafer processing sequence according to the present invention offers the following advantages.

1. DBSCAN categorizes a plurality of lots into groups so that lots with the same or similar process recipes are put into the same group.

2. The processing sequences for the lots in the same group are adjusted to be equal or almost equal so that they can be sent continuously or simultaneously into a machine. Thereby, the number of times for changing the process recipe for the same machine can be significantly reduced, or the idle time for the machine can be shortened.

3. The key parameters are respectively given a weighted value so that the importance of the key parameters can be valued when the process sequence is to be adjusted. Therefore, the categorization of the lots by DBSCAN can be implemented with high precision.

The above-mentioned descriptions represent merely the preferred embodiment of the present invention, without any intention to limit the scope of the present invention thereto. Various equivalent changes, alternations, or modifications based on the claims of present invention are all consequently viewed as being embraced by the scope of the present invention.

What is claimed is:

1. A method of adjusting wafer process sequence, comprising steps of:
   collecting a plurality of production parameters for a plurality of lots of wafers;
   selecting a plurality of key parameters from the production parameters,
   wherein the key parameters at least includes a processing sequence;
   defining a formula to obtain an epsilon value, wherein the formula is $$epsilon = \sqrt{\sum_{i=1}^{n}\left(\frac{p_{ia}}{p_{im}}\right)^2 \times w_i},$$

$p_{ia}$ is an acceptable value for one of the key parameters, $p_{im}$ is an upper limit for one of the key parameters, and $w_i$ is a weighted value for one of the key parameters;
   defining a minimum point number;
   categorizing the lots of wafers into a plurality of groups according to the epsilon value and the minimum point number by using density-based spatial clustering of application with noise; and
   adjusting the processing sequences of the lots of wafers in the groups;
   wherein the density-based spatial clustering of application with noise calculates a difference of the key parameters between two of the lots of wafers by a second formula, the second formula is $$distinct = \sqrt{\sum_{i=1}^{n}\left(\frac{p_i - p'_i}{p_{im}}\right)^2 \times w_i},$$

distinct is the difference of the key parameters, $p_i$ is one of the key parameters of one lot of wafers, and $p'_i$ is one of the key parameters of another lot of wafers.

2. The method of claim 1, wherein the production parameters further includes a time gap and a time delay.

3. The method of claim 1, wherein the step of categorizing the lots of wafers into groups according to the epsilon value and the minimum point number by using density-based spatial clustering of application with noise further comprises steps of:
   randomly selecting one of the lots of wafers as a starting point;
   calculating the difference of the key parameters between the lot of wafer referred as the starting point and the others of the lots of wafers;
   calculating the number of the lots of wafers which have the differences smaller than the epsilon value;
   determining whether or not the calculated number is larger than the minimum point number; and
   if yes, categorizing the lots of wafers which have the differences smaller than the epsilon value and the lot of wafer referred as the starting point into the same group.

4. The method of claim 3, further comprising step of:
If no, selecting another lot of wafers as a next starting point.

5. The method of claim 1, wherein at the step of adjusting the processing sequences of the lots of wafers in the groups, the processing sequences are adjusted to be substantially equal, whereby the lots of wafers in the group can be processed continuously or simultaneously.

6. The method of claim 1, wherein at the step of adjusting the processing sequences of the lots of wafers in the groups, the processing sequences are adjusted to be almost equal.

7. The method of claim 1, which is applicable to a production process.

8. The method of claim 7, wherein the production process includes at least one reference machine and at least one target machine.

9. The method of claim 8, wherein the target machine is a photolithography machine.

10. The method of claim 8, wherein the target machine is a batch-type machine.

11. The method of claim 10, wherein the target machine is a furnace tool.

12. The method of claim 8, wherein at the step of collecting production parameters for a plurality of lots of wafers, the production parameters are obtained from the at least one reference machine.

* * * * *